Feb. 3, 1953 P. A. ALESSI 2,627,096
SAFETY PIN
Filed March 11, 1947

INVENTOR.
PATRICK A. ALESSI
BY
ATTORNEY

Patented Feb. 3, 1953

2,627,096

UNITED STATES PATENT OFFICE 2,627,096

SAFETY PIN

Patrick A. Alessi, West Roxbury, Mass.

Application March 11, 1947, Serial No. 733,947

2 Claims. (Cl. 24—158)

1

The present invention relates to a safety pin of the type in which the pointed end of the pin remains covered when in use. The common spring wire safety pin, when closed, has the pin end prong retained in a guard or cover against which it exerts pressure by virtue of the spring loop which is formed in the wire between the prongs of the safety pin. If the safety pin of this type should come open in use, the prong with the point projects at an angle from the other prong and is therefore dangerously exposed. The pin can be closed manually but if one has to do it by instruments it offers great difficulty. While the commonly used safety pin is given the name "safety" it does, in fact, readily open but does not so readily close. It is also easy for the ordinary safety pin to open in use and there is no tendency for it to close by itself. In fact, it takes accurate manipulation in not a simple manner to close the ordinary safety pin. As contrasted with this, the safety pin of the present invention does not permit the pointed prong to become dangerously exposed when the pin is opened, and, further, the pin if opened can be readily closed merely by pressing the two ends of the pin together. Even when the safety pin of the present invention is opened, the prong with the point is in line with the end guard and remains firmly in line at all times. In view of this feature, in order for the pin to penetrate a garment, the material of the garment must definitely be brought between the jaws of the pin so that the present pin cannot be used as the ordinary safety pin, in which latter case the pointed prong may be directed through the material and into the flesh unless special care is taken.

A further feature of the present invention is that the pin element is formed with two prongs joined by a spring loop, all formed preferably of the same piece of wire. It will also be noted that the guard member is also formed of a single member into which both sides of the pin element extend. As a result of this arrangement, the guard and pin elements remain united to form the safety pin and do not come apart in use.

Further merits and advantages of the present invention will be more readily understood from a description in the specification set forth below when taken in connection with the drawings illustrating an embodiment of the invention, in which.

2

Figure 3:
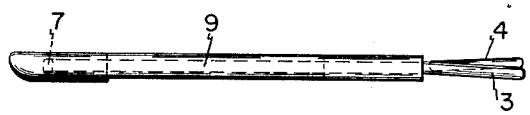
Figure 5:
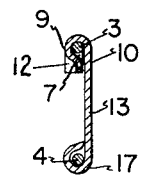
Figure 1:
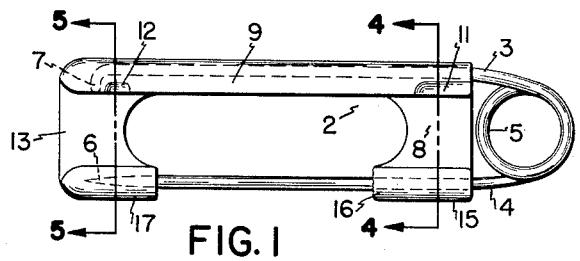
Fig. 1 shows an elevational view of the safety pin in a closed position.
Figure 4:
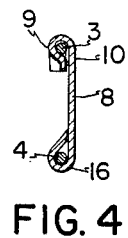

Fig. 3 shows a top view of the safety pin as viewed in Fig. 1;

Fig. 4 shows a section taken on the line 4—4 of Fig. 1;

Fig. 5 shows a section taken on the line 5—5 of Fig. 1; and

Figure 2:
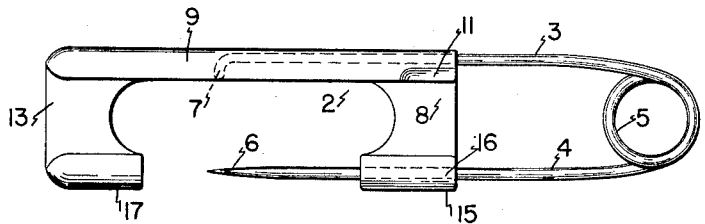
Fig. 2 shows an elevational view of a modification of the safety pin in an open position.
Figure 6:
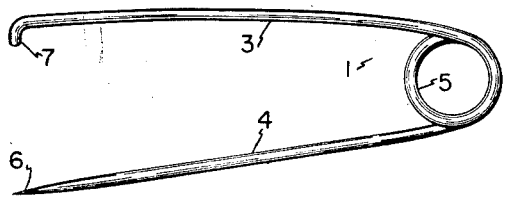

Fig. 6 shows a detail of an element indicated in Figs. 1 and 2.

In the arrangement shown in the drawing, the safety pin comprises preferably two individual elements, the double prong member 1 and the cooperating guard and guide member 2. The prong member 1 may be formed of a wire with the two prongs 3 and 4 joined in a loop 5 at one end of the prongs. The prong 4 may be formed with a point 6, while the prong 3 may have its end 7 bent in the direction of the prong 4.

As indicated in Fig. 6, the prongs when unrestrained are open somewhat from a normal parallel position which the prongs occupy in the positions of Figs. 1 and 2. The prongs may be formed of metal, as, for instance, stainless steel or other suitable composition or alloy, which may be given a non-corroding polish or coating. The guide and guard member 2 may be formed of metal sheet material having in general a U-shaped flat elongated body of non-corroding properties, with end jaw sections 8 and 13 connected by a channel or sleeve member 9, the elements all being formed preferably from the same piece. The prong 3 with the turned-in end 7 slides freely but snugly in the channel in a fit which allows practically no play sideways for the prong. The turned-in wall at the right end of the channel may be pinched against the back plate 10 and the jaw 8 as indicated at 11, so that the turned-in tip 7 will come up against this end as a stop and not permit the prong to be thrown out of the guard and guide member. A slight indentation may also be made at 12 on the channel 9 to act as a lock when the pin is closed. However, this, as indicated in the modification shown in Figure 2, is not essential to its use.

The guard member 2 has a wide jaw opening between the end jaw sections 8 and 13. The jaw section 8 has its end 15 bent around to form a sleeve or closed loop or bearing 16 of such a size that the shank of the pin prong 4 will move through it with a free but not loose-fitting motion. The loop or bearing 16 is sufficiently long so that the prong end of the pin will have its motion directed in the direction of the cap or sleeve end 17 formed at the end of the jaw 13. Preferably the two prongs 3 and 4 move in a parallel direction or at least in a substantially parallel direction with the point 6 of the prong 4 always directed into the cap 17 at the end of the jaw 13. The simultaneous movement of the prongs 3 and 4 easily maintains the prong 4 in alignment in its motion. Further, this construction provides a strong support for the prong 4 so that it is difficult, almost impossible, in ordinary use for the prong to be bent out of alignment to prevent the point from properly seating in the cap 17.

It will readily be seen that the pin must be used by bringing the materials to be pinned together within the space of the jaw 2 and that the point 6 does not project outward of the end of its cap. The spring loop 5 provides sufficient tension between the prongs 3 and 4 so that they are always urged away from each other, the prongs 3 against the top of the channel 9 and the prong 4 against the bottom of the loop 16. In this way, too, the pin is always definitely guided and tensioned to take up any looseness so that there is little likelihood, when the pin is closed, of its missing the cap 17. The loop 5 at the end of the prongs 3 and 4 and the jaw 13 also provide elements which can easily be grasped for closing or opening the pin.

Having now described my invention, I claim:

1. A safety pin comprising a wire with a loop formed therein, said wire having end prongs of substantially the same length extending in substantially the same direction from the loop, one of said prongs being pointed, in combination with a guard and guide plate having the shape of a wide-mouthed U with arms forming the sides of the U, individual means formed along the closed side and at the ends of the arms, respectively, of the U, comprising enclosing channels, with the channels on the arms of the U parallel to the channel on the closed side, said channels on the arms adapted to receive the pointed prong, and the channel on the closed side adapted to receive the other prong, sliding movement of said prongs closing the safety pin across the open side of the U, said other prong having a small turned-in end and its engaging channel having a side restriction at the end engaging said other prong when the pin is in its closed position.

2. A safety pin comprising a wire with a loop formed therein, said wire having end prongs of substantially the same length extending in substantially the same direction from the loop, one of said prongs being pointed, the other having at its end a short inwardly inclined bend, in combination with a guard and guide plate having the shape of a wide-mouthed U with arms forming the sides of the U, sleeves aligned one with the other formed at the ends of the arms of the U, a sleeve formed along the edge of the wide side of the U, said aligned sleeves adapted to receive the pointed prong and the other sleeve, the other prong, one of said aligned sleeves adapted to cover the point of the prong when the pin is in a closed position, means formed in one end of said sleeve along the wide side of the U for preventing said prongs from being withdrawn from the plate, and means formed in said last-mentioned sleeve at the other end for latching the prongs in place in the closed position.

PATRICK A. ALESSI.

REFERENCES CITED

The following references are of record in the file of this patent:

UNITED STATES PATENTS

| Number | Name | Date |
|---|---|---|
| 628,598 | Clark | July 11, 1899 |
| 905,731 | Merrill | Dec. 1, 1908 |
| 1,246,911 | Goozey | Nov. 20, 1917 |
| 1,360,794 | Ralph | Nov. 30, 1920 |

FOREIGN PATENTS

| Number | Country | Date |
|---|---|---|
| 8,181 | Great Britain | of 1891 |
| 131,853 | Great Britain | Sept. 4, 1919 |